Dec. 20, 1955 A. N. GOLDSMITH 2,728,011

COLOR TELEVISION PICTURE AND PICK-UP TUBES

Filed May 1, 1952 2 Sheets-Sheet 1

INVENTOR.
Alfred N. Goldsmith

BY William A. Zalesak
ATTORNEY

COLOR TELEVISION PICTURE AND PICK-UP TUBES

Filed May 1, 1952 2 Sheets-Sheet 2

INVENTOR.
Alfred N. Goldsmith

BY William A. Zalesak
ATTORNEY

United States Patent Office 2,728,011

Patented Dec. 20, 1955

2,728,011

COLOR TELEVISION PICTURE AND PICK-UP TUBES

Alfred N. Goldsmith, New York, N. Y., assignor to Radio Corporation of America, a corporation of Delaware Application May 1, 1952, Serial No. 285,469

8 Claims. (Cl. 313—92)

Figures 1, 2, 3:
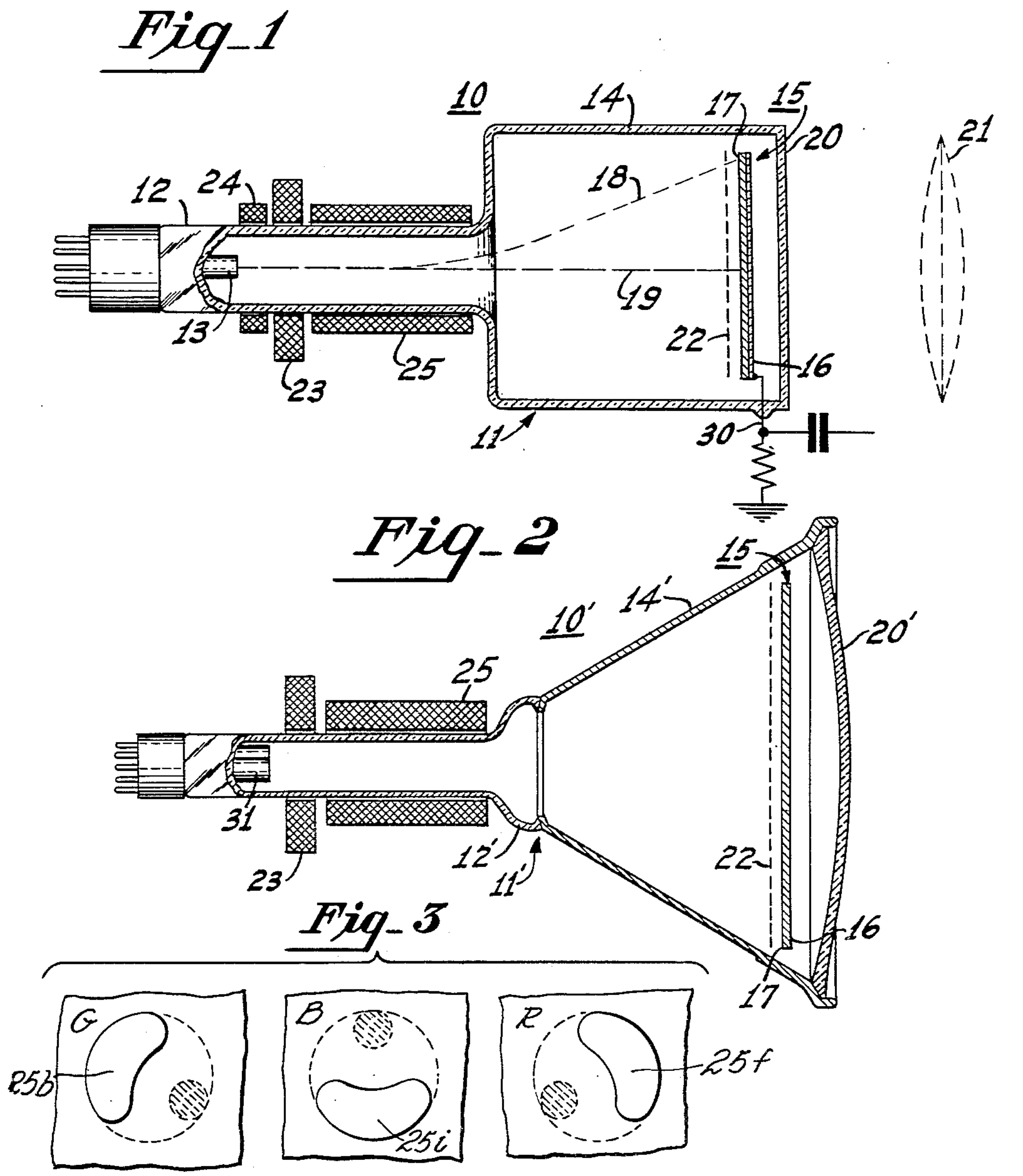

This invention relates to color-television picture and pick-up, i. e., camera, cathode-ray tubes, or, to use a term by which both picture and pick-up tubes are being referred to herein it relates to color image-transducer tubes. More particularly it relates to improvements in "single," all-electronic, types of such tubes, that is to say types which can translate video information between its electrical-signal and color-image forms without being used in groups of more than one and without resort to mechanically moving color filters. The improvements herein disclosed are applicable to both uni-planar and multi-planar single, all-electronic, color-image transducer tubes.

There is a trend in the color television art toward using single image-transducer tubes in both television transmitters and receivers. This is due to the fact cameras and receivers which use a plurality of transducer tubes, despite the great advantage that they can be built with separate (and even stationary) color filters, invariably entail many very serious disadvantages such as electrical and optical registration difficulties, the need for complicated optical systems, narrow viewing angles, unwieldiness, lack of ruggedness, and so forth.

There is also a trend toward using only all-electronic types of single color image transducers. This is due to the fact that the electro-mechanical types of cameras and receivers, e. g., one which uses a more-or-less conventional black-and-white pick-up or picture tube in a sequential type of operation and in conjunction with a moving filter such as a rotating color disc, have most of the characteristic disadvantages of electro-mechanical devices as compared to all-electronic ones, i. e., slowness, vibration, stray magnetic fields, noisiness, susceptibility to wear, and so forth. Incidentally it should be noted that the electro-mechanical types of cameras and receivers, like those using a plurality of transducer tubes, do have the great advantage of permitting the use of separate color filters.

The art has already developed to the point where all-electronic, single image-transducer tubes are available. However, in many instances they do not achieve complete and accurate color separation whether they are "uni-planar" tubes in which the electro-optical component on which images are picked up and reproduced comprises a single but very complex target electrode or "multi-planar" tubes in which this component comprises a plurality of less-complex target electrodes. Hitherto these tubes have had this limitation because they have been made to depend entirely on whatever color separation could be afforded by light-transducing materials which are active in different spectral regions, i. e., photo-sensitive materials which are responsive to light in discrete parts of the visible light spectrum and luminescent materials which generate light in discrete parts thereof. This was considered necessary because of seemingly insurmountable difficulties in the way of using separate stationary color filters either as parts of the single, all-electronic tubes themselves or as parts of cooperating optical systems.

These difficulties have been of different kinds for uni-planar and multi-planar tubes. In the case of uni-planar tubes they relate to the probable manufacturing complexities of making a suitable filter. The single target electrodes of these tubes invariably include intricate microscopically-fine arrangements of myriads of tiny side-by-side co-planar sub-elementary image areas. A suitable filter must provide each of these areas with its own individual color filter positioned in perfect registration with it and with tight optical coupling to its sub-elementary coating of light-transducing material. In the case of multi-planar tubes they relate to the problem of devising an arrangement in which the share of the object light which must reach the active coating of the rearmost target electrode of the electro-optical component, in the case of a pick-up tube, and the share of the image light which must emanate from it, in the case of a picture tube, will be enabled to do so in that the arrangement will permit it to pass through more than one of a group of complementary filters, e. g., will permit the seemingly impossible transmission of light through both a green (or blue) and a red filter.

In the prior art relating to uni-planar tubes, no way of overcoming these difficulties has been suggested which would be applicable to high-resolution and high-definition tubes. Instead, certain ways have been suggested which possibly might overcome said difficulties in low-definition tubes, but which actually are so impracticable, even for them, that in reality they probably could not do so. These suggestions have been to use uni-planar filters, or "filter-rasters," comprising very large numbers, e. g., thousands, of tiny, sub-element size, filter elements assembled in side-by-side relationship. This is an extremely difficult and expensive kind of a structure to build. Moreover, where these filters have been proposed, it has always been in combinations in which they alone provide color separation, probably to avert the serious registration difficulties which would be inherent in combinations in which such filters must cooperate with uni-planar target electrodes having different light-transducing materials also intricately arranged in equally large numbers of side-by-side sub-elementary areas.

In the prior art relating to multi-planar tubes no suggestions have been made of how separate color filters can be used without one or more of them optically getting in the way of one or more of the others.

Accordingly it is an object of this invention to devise improvements in single all-electronic color image transducers to provide them with the color separation afforded by separate color filters.

It is a further object to devise novel color filters.

It is a further object to devise improvements in electro-optical components for image transducer tubes.

It is a further object to devise improved uni-planar color-image transducer tubes.

It is a further object to devise improved multi-planar transducer tubes.

In general, these and other objects have been attained by devising a novel electro-optical component comprised of a very small number of planar multi-apertured filter lamina, e. g., two three, or four, each providing (1) full light transmission along completely unobstructed paths through its apertures and (2) light transmission, which may be spectrally selective in any desired way, through its solid portions; and each being positioned in superposed, rather than side-by-side, relationship to the others, i. e., positioned so that at least one of its surfaces is either in contact with or in closely-spaced relationship to a surface of at least one of the others. At the location of each one of some 1,250,000 or more full-color picture-element areas on each planar lamina the lamina is partially-apertured, it being possible to do this very accurately and inexpensively by a photographically controlled etching-through process which will be described below. The figure of 1,250,000 full-color picture-element areas mentioned above is illustrative, and will of course be increased or diminished in accordance with the desired picture resolution or detail. The etching leaves intact on each lamina a fraction of each full-color picture-element area, such as one half, one third or one quarter, to provide thereat a single-color ("monochrome"), sub-element, "active" area which can intercept and filter a share of the object or image light for that picture element (and, where desired in certain arrangements, a share of the electron beam current) while the removal of the rest of the picture element area provides a physically open and entirely unimpeded optical path (and, where desired in certain arrangements, electron path) through the lamina in question to the "active" sub-element area(s), for the same full-color picture-element area, which are provided by and constitute unapertured parts of the other, underlying, lamina. Thus there is provided a multi-lamina electro-optical component which: (1) in one form, wherein its lamina are directly juxtaposed, can effectively function as a uni-planar filter raster, though it is made by an easy process including nothing more difficult than the selective removal (by photo-etching) of microscopically small subdivisions of an homogeneous lamina rather than by some extremely difficult process of synthesizing myriads of microscopic elements into an intricately organized side-by-side assembly; and (2) in another form, wherein its lamina are in slightly-spaced-apart relationship, is operatively able to function as the first multi-planar filter in which, in effect, no planar filter lamina ever gets in the way of the active sub-elemental area(s) of the other(s). Light-transducing material, either of a single kind, or of several kinds having activity in different spectral regions where the material is intended to contribute to the attainment of color separation, may be inexpensively applied to the filter elements as simple uniform coatings. The resulting combination affords at the myriads of discrete sub-elementary areas individual, translucent, sub-elementary coating supports which may serve as individual, separate, sub-elementary color filters and to which the sub-elementary active coatings are optically coupled closely and exclusively. There is no difficult and expensive structure to build and there are no inherent registration difficulties.

A feature of the invention, namely use of the disclosed light transmissive (glass), as distinguished from the prior-art opaque (metal), apertured planar-electrodes ("lamina") in certain multi-planar image transducer tubes, whether these light transmissive elements also have a light filtering action or not, results in improvements over the prior art additional to the provision of separate color filters.

These improvements derive from the fact that light transducing material(s) may now be applied to the "back" surfaces of the target electrodes, where they will be directly exposed to electrons approaching the side of the electro-optical component which is opposite to its optically effective side, and yet light will be able to reach the material or emanate from it through these electrodes due to their translucency or transparency. The term translucency as used herein is intended to mean capable of transmitting light and therefore to include transparency, and is not intended to necessarily involve diffusion of the light which it transmits though diffusion will often be permissible.

Figure 4:
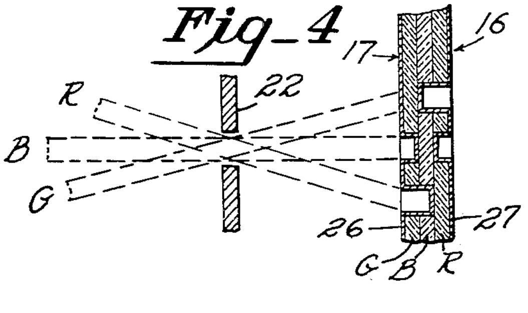
Figures 5, 6, 7, 8, 9:
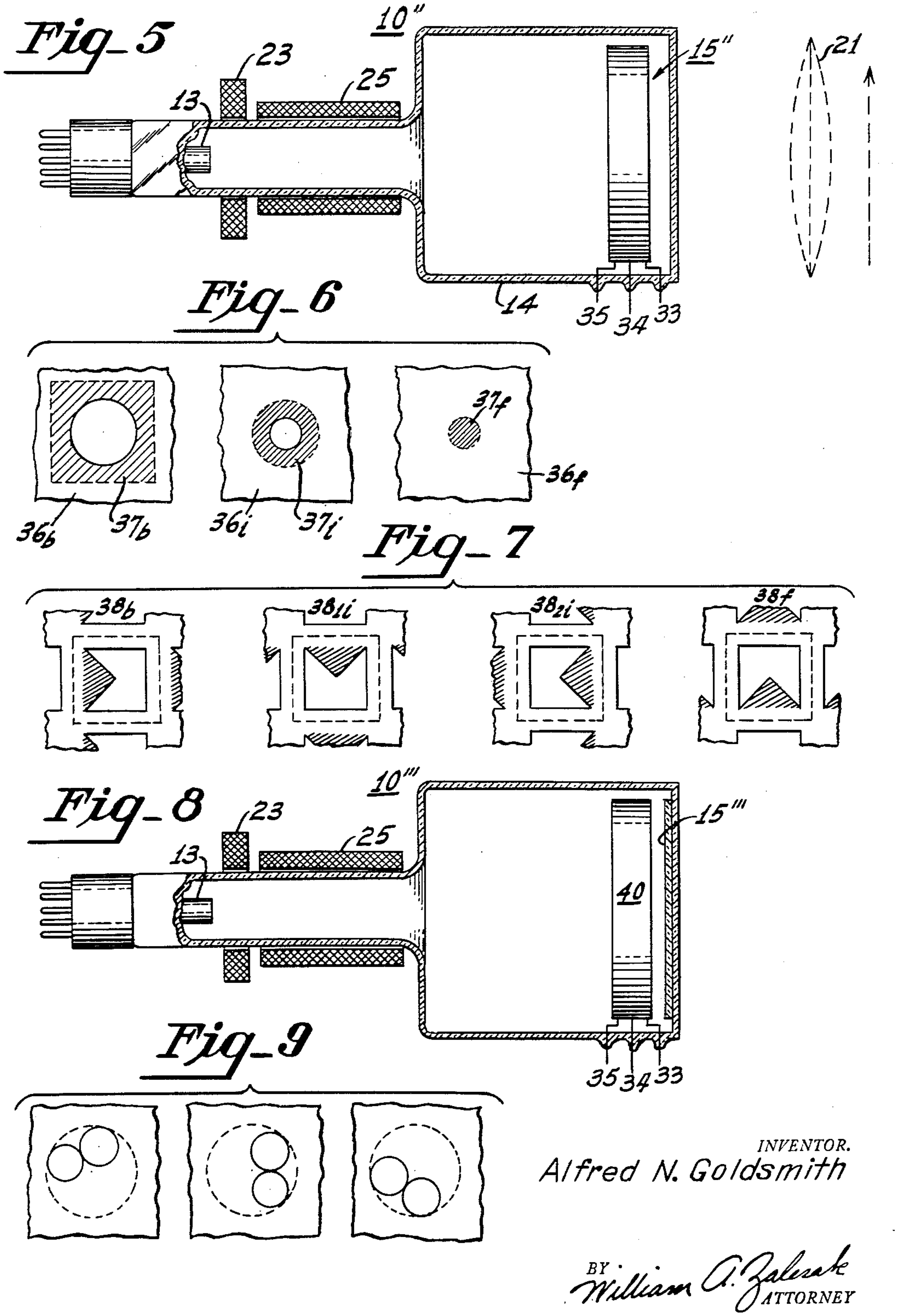

In the drawings:

Fig. 1 represents in partial cross section a uni-planar, multi-lamina color-image transducer which embodies the present invention; utilizes different directions of convergence for causing the cooperation between the beam and the electro-optical component to be color selective; is adapted to sequential operation at field, line or picture-element rates and may be embodied for use as either a picture or a pick-up tube;

Fig. 2 represents, in partial cross section, a uni-planar, multi-lamina, directional transducer, which is very much like the embodiment of Fig. 1 with a modification which adapts it for simultaneous operation but limits it to use as a picture tube;

Fig. 3 represents an exploded, microscopically-small fragment of a multi-lamina electro-optical component suitable for use in transducers of the types shown in Figs. 1 and 2 in their appropriate forms for three-component color television systems. In its actual size this fragment, which includes only one full-color picture element, will be extremely small, e. g. 10–100 mils squared. However, it is represented as being magnified, between say ten and one hundred fifty times, for the sake of clarity;

Fig. 4 represents a transverse sectional view of a similar microscopically-small fragment of an electro-optical component as in Fig. 3, the fragment also including only one full-color picture element but being represented with the fragments of its respective lamina in juxtaposed rather than exploded relationship. This figure shows (1) how the electron beam can cooperate selectively with respective sub-elementary areas of the picture element in accordance with its direction of convergence upon the "masking electrode" of the tube; and (2) how there are unimpeded light transmission paths to or from each of the lamina despite their relationship of overlying each other;

Fig. 5 represents in partial cross section a multiplanar color image transducer which embodies the present invention; uses physical and electrical separation of the light-transducing lamina of its electro-optical component to permit the cooperation of the beam therewith to be color selective; is adapted to either sequential or simultaneous operation; and may be embodied for use as either a picture or a pick-up tube;

Fig. 6 represents an exploded, many-times-magnified, microscopically-small fragment of a type of electro-optical component, comprising lamina which are translucent without being selectively so, i. e., are translucent without having a filtering action, which is suitable for use in transducers as in Fig. 5 in forms thereof which are appropriate for three-component color television systems. One may think of this fragment as being "exploded" to a lesser degree than that of Fig. 3, since the lamina therein are normally in actual contact with each other (to form a uni-planar multi-lamina electro-optical component) whereas those herein are normally in spaced-apart relationship, which is of course very greatly expanded in this figure (to form a multi-planar component);

Fig. 7 is a representation like that of Fig. 6, except that in this case the fragment is part of an electro-optical component whose lamina do have a filtering action, and incidentally happens to be suitable for use in forms of the transducers of Fig. 5 which are appropriate for four-component color television systems;

Fig. 8 represents in partial cross section a color-image transducer which uses a multi-planar switching assembly (1) for indexing-down (in the sense of breaking-down or subdividing) the scanning electron beam into fine electron jets, the jets being individually directed through "conduits" in the assembly onto respective sub-elementary areas of a uni-planar electro-optical component, and (2) for switching or modulating the jets individually, the uni-planar electro-optical component for this transducer utilizing a multi-lamina construction which embodies the present invention; and, Fig. 9 is a representation, like that of Fig. 3, of a uni-planar multi-lamina electro-optical component which is suitable for use in the transducer of Fig. 8.

The transducer 10 shown in Fig. 1 comprises an evacuated envelope 11 having a neck portion 12 containing an electron gun 13 and a bulb portion 14 containing a uni-planar, multi-lamina, electro-optical component 15. The component 15 has an "optically-effective" side 16 which faces out of the bulb portion 14 through a transparent window 20 thereof and an opposite side, herein referred to as its "electrically-effective" side 17, which is exposed to scansion by a beam from the electron gun 13. In picture-tube embodiments of the transducer 10 the full color images which are synthesized on the component 15 are projected from it out through the window 20, unless they are to be directly viewed, while in camera tube embodiments the full color images which are analyzed on the component 15 are projected onto it in through the window.

For projection in either of these directions as desired one may use a light focusing optic mounted near the outside surface of the window 20 in appropriate spaced relationship to the component 15. Such an optic is represented at 21 and is shown in dotted lines to indicate that its use is optional, since, for example, it will not be used where the transducer 10 is a directly viewed picture tube.

A multi-apertured "masking electrode" 22, which is associated with the component 15 and preferably is part of a rigid structural assembly formed therewith, is mounted closely adjacent to the electrically-effective side 17 and serves to block all but certain selected paths for electrons directed toward it from the gun 13. Since the function of the masking electrode and suitable ways for making it have already been fully described elsewhere, for example in co-pending applications (1) Goldsmith Serial No. 762,175, filed July 19, 1947, now U. S. Patent No. 2,630,542, issued March 3, 1953, (2) H. B. Law Serial No. 158,901, filed April 28, 1950, now U. S. Patent No. 2,625,734, issued January 20, 1953, and (3) U. S. Patent 2,581,487 Dietrich Jenny they will not be described herein in complete detail. However, it will be helpful if at least the following is borne in mind. The masking electrode is a foraminous indexing device which in effect collimates the supply of electrons which impinge upon any part of its back surface at any instant thereby forming them into one or more fine electron jets depending on how many of its foramina are subtended by the electron beam's area of impingement. Each foraminum, of which there is a respective one for each full-color picture element, has a dimension, such as its diameter (for a round foraminum), which is substantially equal to a corresponding dimension of each single mono-chrome sub-element of the group of two or more thereof constituting the full-color element underlying the foraminum on the electrically-effective side 17. Thus the beam is formed into one or more jets each of which is small enough to strike only one sub-elementary area at a time if it is properly directed thereat through the foraminum which collimated it. In order to attain color-selective cooperation between the jets and the component 15 through control of the direction of convergence of the beam two conditions are satisfied: (1) each full color picture element on the electrically effective side 17 (each full element consisting of a group of two or more sub-elements positioned closely side-by-side to each other, such as a "triad" of three mono-chrome phosphor dots positioned at the respective corners of a triangle), is positioned thereon at the point of intersection of the "integrated" mean electron path (the intended meaning for this expression is more fully indicated below) which extends from the tube's centroid of deflection through the center of the one particular foraminum which is predetermined to be associated with that picture element; and (2) means are provided for controlling the electron beam so that at any given instant it will approach any foraminum (*a*) toward which it may then be directed in only one of a number of different predetermined directions of convergence toward the "integrated mean electron path thereto," the directions being so chosen that for each of them a jet formed by electrons passing through a foraminum will selectively strike a different single sub-elemental area. In the Fig. 1 embodiment this means comprises a focusing coil 23 and an electron-deviating means 24. The coil 23 is to all intents and purposes the same kind of focusing coil as is ordinarily used to cause beam electrons which leave an electron gun in a narrow cone of variously divergent paths to have their respective divergences reversed into corresponding convergences so that they will come into focus at an "electrically-effective" surface. In other words it provides an electron optic which converts each divergent electron into a correspondingly convergent one. The deviating means 24 is adapted to deflect the entire conically divergent beam of electrons radially outward in different directions so that its instantaneous mean axis may be diverted to different sides of an axis 18 herein designated "the integrated mean axis," this being the mean axis of all of the beam electrons moving through the neck during a significant interval of time. Therefore in cooperation with the deviating means 24 the electron optic afforded by the coil 23 becomes effective to cause the entire beam, as such, to approach the integrated mean axis in controllable directions of convergence at the same time that, as usual, it converges the individual electrons into focus. From the foregoing it will be seen that in the absence of any scansion-producing beam deflection the integrated mean axis 18 will coincide with the tube axis 19 and the instantaneous mean axes will be differently convergent towards it. While the operation of convergence control may be easier to visualize under these conditions it actually remains basically the same when the beam is deflected in two coordinates, for example by a magnetic deflection yoke such as that shown at 25 in Fig. 1, to produce a periodically scanned raster. Under these actual operating conditions the different directions of convergence are still toward the integrated mean axis even though it is rapidly scanning.

Reference is made to the Law process (U. S. Patent 2,625,734) for making dot-phosphor uni-planar fluorescent screens for directional color-television tubes so that their full-color picture elements, e. g., triads of phosphor dots, are positioned to satisfy the condition (1) referred to above. According to one part of the process a point source of light is placed at successive respective times at the centroids of deflection corresponding to the different directions of convergence for the electron beam. At each of these times the masking electrode 22 collimates the light emitted by this source in the same manner that it will eventually collimate the electrons from the gun 13 when they are convergent in a respective one of said directions. The thus collimated light is made to act upon a different photographic film for each position of the point source of light and from these films apertured templates are made through which it is possible to squeegee luminophor pastes onto a carrier plate to form the dot-phosphor screen.

According to the present invention the multi-lamina component 15 may be made by a modification of the process set forth in the above mentioned co-pending application. According to the Law process each template has an aperture at the location of one sub-element area in each full-color picture element and it is un-apertured at the positions of the other sub-elements. According to the present invention the converse should be done, i. e., the process should be modified so that the template instead will be apertured at the positions of all but one of the sub-elements of each full color picture element, this being desirable for reasons which will be more apparent from the description which follows. Thus each film will be exposed to light emitted by the point source when it is positioned at all but one of the above-mentioned centroids of deflection. Moreover it may be advantageous in exposing each film to slowly move the point source of light continuously between the positions of each adjacent pair of said centroids so that the template produced from the film will have a single generally crescent-shaped aperture in effect including separate respective apertures for all but one of the sub-elements at each picture element area, for example, crescent-shaped apertures like the apertures $25_b$, $25_i$, and $25_f$ shown in Fig. 3. A template produced in this way will be used according to the present invention not for squeegeeing a phosphor paste onto a carrier plate but rather for controlling the manner in which a glass lamina will be exposed to irradiation with light rays as part of a photo-etching process more fully described below. For this reason actual apertures are not essential so much as translucencies (or transparencies) which are appropriately shaped and positioned according to the modified Law process described above.

A type of glass which was developed recently by the Corning Glass Company of Corning, N. Y., and which is described on page 19 in the Journal Commerce, 9–12–51, undergoes such a chemical change when irradiated with light rays that by exposing only parts of a plate they may be rendered selectively etchable while the others, being unaltered, will remain substantially impervious even during complete submersion in the etching fluid. In this way it is possible to form intricately engraved lacy glass structures with a fineness and precision never before possible.

According to one way of practicing the present invention each lamina of the multi-lamina electro-optical component is made of the new photo-sensitive glass; it is irradiated with light through an opaque apertured template made by the above-described modification of the process disclosed in the Law application; and thereafter it is etched through according to the Corning process. As a result part of the lamina at each full color picture element area is removed and part is left intact to serve as a support for a sub-element size active coating and, where desired, to serve further as a sub-element filter. Where the lamina are made of glass of different colors, such as the green, blue and red lamina G, B, R of Fig. 3, it will be necessary to irradiate each of them with light which can be transmitted through it, or (as in the case of pure white light) includes components which can, so that deep, rather than merely superficial irradiation will be effected. If it is desired to use ordinary glass the following process may be employed: lamina thereof may be coated with a photo-sensitive protective mordant; the lamina then be exposed to the light from the point source (in lieu of the film for a template); the irradiated portions of the mordant then be washed away; and the lamina then be etched through the openings in the mordant.

For the manufacture of multi-planar multi-lamina components the lamina should be individually formed in any suitable way, such as by one of the above described processes, and thereafter individually coated with active transducing materials and assembled in close-spaced relationship. Moreover they may be individually formed and coated even when they are to be used in uni-planar components. This procedure makes it possible individually to coat the separate lamina with different active materials, such as photo-emitters, photo-conductors, and luminophors, i. e., materials which are active in different spectral regions, whereby in the entire transducer better color separation will be attainable due to the combined selectivities of the active coatings and the filter lamina.

However, if it is desired for any reason, it is also possible to assemble the uncoated etched-through lamina in juxtaposed relationship to form a foundation for a uni-planar electro-optical component and thereafter to apply one coating of an active material having a broad spectral response ("panchromatic") over the entire electrically effective side of the component. In this case the material must be so applied that it will coat all exposed surfaces of all of the lamina, e. g., it must reach all of the underlying sub-elementary areas by being settled, sprayed, dusted or the like through the apertures of the overlying lamina to form a two, three or four level coating such as the simple three level (or three "step") coating 26 a fragment of which is shown in Fig. 4 and is so cross-sectioned that only two steps or levels of the coating can be seen. In such an embodiment the attainment of color-separation would depend entirely upon the light filtering action of the lamina. Incidentally, it should be borne in mind that a lamina may have a light filtering effect without being made entirely of a light filtering material, such as colored glass, e. g., it may be made of colorless glass and simply carry a thin colored coating such as a glaze.

If preferred the embodiment represented in Fig. 4 may be formed in the following manner to provide a relatively rugged electro-optical component; a number of solid (i. e., unapertured) color-glass lamina each capable of selectively transmitting a complementary component of full white light may be assembled together and caused to become adherent to one another for example by first dusting their interfaces with low melting point glass powder and then heating them slowly at a carefully controlled temperature at which the low-melting point glass will eventually soften enough to cause adherence. The template for an outside one of the lamina such as the back lamina G in Fig. 4, may be applied to its exposed side and that lamina then irradiated with light of the exact color which it transmits, e. g., green light for a green lamina. This light will not penetrate through into the other lamina and therefore, since they will remain unaltered, it will be possible to submerge the entire assembly in etching fluid and yet remove only the irradiated portions of the green lamina. Thereafter the template for the lamina immediately behind the green one, such as the blue intermediate lamina B in Fig. 4, may be placed adjacent the exposed surface of the green lamina and the assembly irradiated with blue light (preferably parallel rays thereof impinging at right angles upon the template). This light will penetrate through the apertures or translucencies of the template and then through portions of the apertures of the green lamina to a part of each of the sub-element areas of the blue lamina all of which it is desired eventually to etch away. These irradiated blue parts may be removed by submersion-etching and then the entire thus-far described procedure may be repeated working from the other side of the assembly, for example starting with the exposed surface of a red front lamina, R. In this way the red lamina will be etched first and, then, after it, the remaining parts of the sub-element areas of the blue lamina which could not be reached through the green lamina. The completely etched assembly comprising apertured and mutually adherent lamina like the lamina G, B, and R in Fig. 4 can thereafter be coated (as at 26 in Fig. 4) with an active material, such as a luminophor, a photo-emitter, or a photo-conductor, on its electrically-effective side and, if desired, its optically effective side may be coated with a conductive film 27 of material, such as that produced by pyrolitic deposition from a mixture of air or oxygen and the vapors of tin (stannic) chloride and methanol. When the transducer 10 is a pick-up tube a coating such as the coating 27 will perform an essential function as a backing plate whereas in a picture tube it may perform a less essential function as a polarizing electrode.

Consider the operation of the transducer 10 shown in Fig. 1 where its electro-optical component 15 is of the kind shown in Fig. 4 and is coated on its electrically effective side 17 with, say, a photo-emitter and on its optically-effective side 16 with a conductive film such as the film 17 previously referred to. Object light focused upon the optically effective side 16 will be filtered at each sub-elemental area thereof so that photo-emission will occur from each of the sub-elemental areas in accordance with the color and intensity of the light thereat. If the beam from the electron gun 13 is nutated, by respectively feeding two 90 degree-displaced coils in the electron deviating means 24 with two quadrature-related harmonic (sinusoidal) waves of current having an alternating frequency which is very much higher than the line scansion rate, e. g., 3.5 megacycles per second, the beam in scanning across each aperture in the masking electrode 22 will project a jet of electrons through it in three different directions in rapid succession so as to successively erase the positive charges on the sub-elementary coatings of the picture element underlying the aperture. At the same time the beam current is periodically switched on-and-off at three times the nutation rate, e. g., by pulse modulating the gun 13, so that no electron jet will impinge on two sub-elementary areas at the same time. As a result small sequential impulses of electron current will flow to the coating 26. Since these are capacitively coupled to the backing plate afforded by the conductive coating 27 and since it in turn is connected to an external terminal 30, a sequential (time-sharing-multiplexed) full color signal will be conveniently available.

Circuit techniques which are well known may be employed for deriving signals from the currents feeding the means 24 and for converting these signals into color synchronization pulses; gun keying pulses; pulses for actuating commutating means, if it is desired to separate the multi-plexed mono-chrome signals, e. g., in order to place them on separate transmission media; and/or control pulses of any other kind essential in the operation of a complete transmit-receive color television system.

As will be understood by those familiar with the art, all of the arrangements disclosed herein, for providing selective cooperation between the beam and the electro-optical component in combination with the use of separate color filters in a single, all-electronic color image transducer tube, will lend themselves to embodiment in a great variety of ways which are well known in the art and therefore do not need to be fully described herein. For example, in pick-up tube embodiments the active coating(s) for the electro-optical component may be made of one or more photo-emissive materials, or one or more photo-conductive materials or of photo-emissive material(s) for some lamina and of photo-conductive material(s) for the other(s); one may utilize either a high or low velocity electron beam for reading the charge images; and the electro-optical components may comprise 2, 3, 4, etc. lamina depending on how many components are to be utilized in the given color television system. Similarly in picture tube embodiments the active coatings for the electro-optical component may be made of one or more light emitting materials, luminophors, or of light "valving" materials, as scotophors.

However it is not deemed essential to describe in detail herein the circuit variations; applied potentials adjustments; and minor structural changes which may be necessary or desirable in going from one of these kinds of operation to another and/or in changing from one type of active coating to another since all of this is well understood and developed in the art. For example a number of possible variations in electro-optical electrode arrangements for a color television pick-up tube and of possible modes of operation are fully described in co-pending application, Serial Number 256,705 of A. L. Tirico filed November 16, 1951.

An example of one of many structural details which may be judiciously employed in embodying the present invention, but all of which need not be described in detail, is the use of an aluminum film evaporated onto the electrically effective side of a multi-lamina electro-optical component. Whereas in a picture tube such a film could serve useful functions as an ion filter and a light reflector, in most conceivable pick-up tubes it would be quite undesirable.

The embodiment of Fig. 2, except for the appearance of its picture-tube type composite metal and glass envelope 11, is very much like that of Fig. 1. However in this case instead of using one gun in combination with an electron deviating means to cause a single beam sequentially to assume a number of different directions of convergence as explained above, a cluster of guns 31 is utilized to provide an equal number of beams which are simultaneously convergent in the respective directions. This is often preferred for picture tube use since it permits more than three times as much electron current to reach the electrically-effective side and therefore increases the amount of generated light. However it is not suitable for pick-up tube embodiments of the transducer since the uni-planar electro-optical component 15 has but a single backing plate (27) which would totalize the individual instantaneous mono-chrome current pulses simply to produce a black-and-white video signal without color separation. However, if desired, one may use a multiple gun structure like the cluster 15 in conjunction with appropriate keying on and off of the respective beams provided thereby and thus may adapt this type of structure to pick-up tube use. Such a tube might be preferred because it does not require an electron deviating means nor the current sources feeding it.

Where a component part of the transducer 10′ of Fig. 2, or of the transducers 10″ and 10‴ of Figs. 5 and 8, is either (1) substantially identical or (2) very similar to a corresponding part of the transducer 10, this being indicated in the drawing by (1) the respective use of either the same reference numeral or (2) the same reference numeral single, double or triple primed, the identification and/or description of the part which was given above with respect to the transducer 10 may be deemed applicable to both.

As distinguished from the transducer 10 of Fig. 1 the transducer 10″ of Fig. 5 is of a multi-planar type, that is, each of the lamina of its electro-optical component (which is represented by the block 15″) is physically spaced away from the others. Pick-up tube embodiments of this transducer may be considered as improvements on the pick-up tubes disclosed in the above-mentioned co-pending application of A. L. Tirico. Accordingly, i. e., because of the many points of similarity between the transducer 10″ and the tubes disclosed in that co-pending application, reference is again made thereto for a considerable amount of pertinent detailed descriptive matter which need not be repeated herein.

In the pick-up tubes described therein each of the planar electrodes of the electro-optical component employs at the location of each full color picture element an aperture which is in alignment with the corresponding aperture(s) of the other lamina(s). The electro-optical component is both electrically and optically effective on the same side. To this end the side in question faces toward a transparent window in a pipe-shaped envelope and the electron gun, which is directed at the same side, is kept from masking any part of the optical path extending between the exterior of the tube and said side through said window by being mounted in the off-set neck. In addition, at the location of each picture element the apertures of successive planar electrodes, in the order in which they are encountered by the beam, are progressively smaller. As intended to be shown by the representation of Fig. 6 herein, this is also true of the apertures of the two, back and intermediate, lamina (36$_b$ and 36$_i$) of the three lamina 36$_b$, 36$_i$, and 36$_f$ comprised in the electro-optical component 15″ of the transducer 10″. In this type of arrangement the rearmost apertured element, i. e., the back planar "electrode" or "lamina," indexes the beam, and, while it is so doing, the peripheral beam current which it intercepts usefully reads the charge image thereon, and thereafter the thus indexed jets are reindexed by the underlying electrode(s) or lamina during which time(s) the small amounts of their currents which are intercepted usefully read off the remaining charge image(s). Thus the electron current is shared by all of the electrodes (or lamina). Since the object light impinges on the same side of the electro-optical component it is similarly indexed and shared. As indicated in the Tirico application, this type of pick-up tube is capable of simultaneous operation since respective backing plates carried on its physically and electrically separated planar elements can feed individual mono-chrome video signals to separate transmission media over respective outside terminals like the terminals 33, 34 and 35 of Fig. 5. The transducer 10″ differs principally from pick-up tubes of the application in question by replacing the planar electrodes of their electro-optical components with similarly apertured translucent (or transparent) lamina to the end that the object light can be directed upon the opposite side of the electro-optical component from that on which the beam is directed. This permits the use of a straight envelope and thereby eliminates the need for keystone correction circuits and unusually complex means for normalizing the final approach paths of the beam to cause it to impinge on all parts of the electro-optical component at the same, 90° angle.

The exploded fragment shown in Fig. 6 comprises fragments of three translucent lamina, $\mathbf{36}_b$, $\mathbf{36}_i$ and $\mathbf{36}_f$ (the subscript letters, *b*, *i* and *f* representing respectively back, intermediate, and front). It will be noted that the front translucent lamina need not be apertured at all. The sub-element active area $\mathbf{37}_f$ which is shown shaded thereon is the part of this lamina which will be bombarded by a twice-indexed stream of electrons whenever the beam passes over the location of the full color picture element including this sub-element. This will be true whether this lamina carries one homogeneous coating over all of its back surface or myriad tiny dot-sized coatings each restricted to such an area of actual bombardment, either of which may be readily employed as may be desired for particular applications. If dot coatings are to be employed they may be applied in any suitable way, such as by spraying, settling or squeegeeing processes in which the intermediate lamina is used as a template. If, on the other hand, a single homogeneous coating is employed it should be thin enough to be capable of a substantial percentage of light transmission like any of a number of well known "semi-transparent" active coatings.

Similarly the lamina $\mathbf{36}_i$ and $\mathbf{36}_b$ will be bombarded only on their respective sub-element active areas $\mathbf{37}_i$ and $\mathbf{37}_b$. In the case of the intermediate lamina, $\mathbf{36}_i$, this will be a result of the indexing of the electrons by the back lamina $\mathbf{36}_b$ whereas in the case of the latter lamina it will result from the fact that all the rest of the full color picture element has been removed by the etching. As has already been pointed out the active coatings which are applied to the lamina may be either photo-emitters, or photoconductors or one or more of each. Where the electro-optical component utilizes lamina which are apertured as shown in Fig. 6 they should be made of material which is translucent to full white light, since, as indicated above, light cannot pass through more than one of a plurality of accurately complementary filters. As a result in an embodiment comprising such an electro-optical component the only color separation attained will be that provided by the selectivities of the photo-sensitive materials.

However, if desired, the following procedure may be followed: (1) the lamina may be made of colorless translucent glass, (2) sub-element filtering films, such as glazes, may be applied to the areas $\mathbf{37}_f$, $\mathbf{37}_i$, and $\mathbf{37}_b$, in a manner similar to that set forth above in which sub-element active coatings are applied to certain of the lamina by using others as templates; and then (3) either sub-element active coatings may be superimposed over the areas carrying the films or one uniform translucent active coating may be applied over the entire back surface of each lamina, the materials for the active coatings being selectively responsive or not as desired. In such embodiments, as will be obvious from the foregoing, excellent color separation will be attainable.

It may be of interest to note with respect to an electro-optical component of the type represented in Fig. 6 that, while its front lamina does not necessarily have to be apertured, all of the rest do, that is to say, each of all but one of its lamina must be partially apertured at the location of each full color picture element. For example assuming that each full color picture element occupies a square area whose outer periphery corresponds to that of the sub-element area $\mathbf{37}_b$, then at the location of each thereof a round central portion comprising about two thirds of its area must be removed in the case of the back lamina, as shown in Fig. 6, and a corresponding portion of about one third of its area must be removed in the case of the intermediate lamina.

Thus at the location of each full color picture element the bombarded portions of the several lamina comprising the component 15″ will have substantially equal areas.

The principal difference between the type of arrangement shown in Fig. 6 and those shown in Figs. 3, 7 and 9 (which may also be used in the Fig. 5 transducer) is that in all of those others the light, as well as the electrons, can reach the active sub-element areas of each lamina over physically open paths whereas in the case of the embodiment of Fig. 6, even though physically open paths are provided for the electrons, the light can reach certain sub-element active areas only by penetrating transparencies of the overlying lamina.

Fig. 7 represents possible geometric shapes for the sub-element active areas which afford a high percentage of utilization of both the available electron current and the available light. The shapes are such that projections of the sub-element areas on a common plane nest compactly together and in so doing constitute full color picture element areas which in turn lend themselves to compact nesting with adjacent full color picture element areas. In the embodiment of Fig. 7 there are four laminas: the back lamina, $\mathbf{38}_b$; the front lamina, $\mathbf{38}_f$; and two intermediate lamina, $\mathbf{38}_{1i}$ and $\mathbf{38}_{2i}$. Because of the use of four lamina, this type of electro-optical component is suitable for use in four component color television systems, for example in a system using four monochrome complementary component colors or in one using three monochrome complementary component colors and one full white component to provide a "key image" such as that referred to in the above-mentioned co-pending application of Alfred Goldsmith. It will be apparent from the foregoing that where a pattern of apertures such as that of Fig. 7 is employed, i. e., where physically open optical and electron paths are both provided and are maximized, single homogeneous (and even opaque) coatings may be applied to each of the lamina without any deleterious effect on color separation or on the efficiencies with which the light and electron current are utilized.

The transducer 10″ may be embodied and operated as a picture tube by coating its lamina with suitable fluorescent materials and then applying very large magnitude switching voltages to each lamina through the leads 33, 34, 35, respectively, in the manner taught by Bronwell in U. S. Patent Number 2,461,515. For the most successful operation of this type it will be advantageous to mount a foraminous screen electrode, e. g., one made of fine mesh screen, between the electrically effective side of its electro-optical component and the electron gun and to polarize it at a fixed potential of, say, ten thousand volts so that the electron-focusing and raster-forming means of the tube will be able to operate under stable conditions with the electrons encountering a constant accelerating field gradient in moving through the bulb portion 14 over most of the distance to the rearmost active coating. After passing through this electrode and just before reaching any lamina the electrons can be retarded, where it is desired to switch off that lamina, by applying such a large-magnitude negativegoing switching potential to it so that they impinge thereon and pass therethrough at velocities too low to energize its active coating; or they may be allowed to continue unretarded or be reaccelerated to cause high-velocity impingement on a lamina which it is desired to switch it on. Reference is made to methods, by which the need for large-magnitude switching voltages in multi-planar picture tubes can be overcome, which are disclosed in the co-pending application of Stanley Forgue, Serial Number 145,861, filed February 23, 1950 as offering possible advantages for picture tube embodiments of the transducer 10''.

The transducer 10''' in Fig. 8 employs a multi-planar structure 40 which is associated with a uni-planar electro-optical 15''' component and performs the functions of (1) indexing the scanning beam to form it into jets; (2) directing the jets so that they impinge selectively on sub-element active areas of the electro-optical component; and (3) switching or modulating the jets. Transducers using this type of selective cooperation between the beam and an electro-optical component are fully described in U. S. applications Serial Number 151,397, filed March 23, 1950; and Serial Number 168,562, filed June 16, 1950. If desired the assembly 40 can be operated simply for the selective switching on and off of jets with the video modulation being accomplished at the grid of the single electron gun 13. When used in this way the transducer 10''', like the transducer 10 of Fig. 1 can only be operated sequentially. Though selective cooperation between the electron beam and the electro-optical component 15''' is accomplished in a different way than that between the beam and the component 15 of Fig. 1, nevertheless the electro-optical component 15''' may in many respects be identical with the component 15 of Fig. 1. One difference which does exist arises from the fact that the electron jets which are formed by the indexing action of the rearmost electrode of the multi-planar switching structure 40 should preferably move through its other electrodes and then proceed on to the component 15''' along parallel paths which are normal to the plane of the electrically effective surface. For this reason the positioning of the groups of sub-elements constituting full color picture elements does not have to be accomplished by the above-described process involving the use of a point-source of light. All that is necessary is that all of the apertured electrodes of the switching assembly employ similar positioning for their respective apertures, so that when they are combined into an assembly the apertures can be aligned to afford in effect a very great number of tiny electron conduits, and that each sub-element of the component 15''' be in exact alignment with a predetermined respective conduit. Thus one may arbitrarily pick any one of a large variety of suitable patterns for the locations of apertures and may start the process of making actual apertured electrodes and lamina by drawing the pattern (on a very large scale if necessary in order to facilitate the work, the drawing then being easily reduced photographically), or by the use of a microscopically accurate engraving machine. The sole requirements which must thereafter be met after a first apertured element has been made are that the others, i. e., apertured electrodes of the structure 40 and lamina of the component 15''', must have their corresponding apertures similarly positioned and must be assembled with those apertures in proper alignment. In fact all of this is also true of the apertured lamina comprised in the multi-planar electro-optical component 15'' of the transducer 10'' of Fig. 5.

While the assembly 40 and the component 15''' have been described as two discrete structures, it should be understood that in actual practice they will either eventually be fastened together after being formed as sub-assemblies individually or they will be assembled together as a unitary structure to begin with.

Fig. 9 represents an exploded fragment of component 15''' and may be considered as corresponding in most respects to the showing of Fig. 3, except for the differences noted above with respect to the positionings of the full color picture elements and except for the further minor difference that the apertured portion of each lamina at the location of each full color picture element is not in the form of a single crescent-shaped opening but rather of a plurality of small round ones. Actually it is a matter of choice as to whether separate apertures are used or are combined together as shown in Fig. 3. However, since in the process of irradiating glass lamina for the component 15''' it may be expedient to use appropriate ones of the apertured electrodes of the structure 40 as templates, then this process will prove to be simpler if the objective be to etch through the apertures independently as shown in Fig. 9.

As is fully explained in the two applications last-mentioned above, a transducer of the type shown in Fig. 8 is capable of simultaneous operation. In such operation it is not the current of its single scanning beam that is modulated (by applying a multiplexed color video signal to the grid of its gun 13), but instead the currents of respective ones of the jets produced in the structure 40. To this end individual mono-chrome video voltages are applied to respective apertured electrodes of the switching structure 40 through the leads 33, 34 and 35, respectively, to modulate the jets rather than square waves simply to switch them on and off.

It will be apparent from all of the foregoing that the transducer of Fig. 8, since it employs a uni-planar electro-optical component, may be embodied as a pick-up tube only when it is operated in a sequential manner. Thus with this reservation it is to be understood that the transducer 10''' may be embodied as a pickup as well as a picture tube.

Obviously many modifications and variations of the invention as hereinbefore set forth may be made without departing from the spirit and scope thereof, and therefore only such limitations should be imposed as are indicated in the appended claims.

What is claimed is:

1. An electro-optical component for a television transducer comprising a first light-transmissive lamina containing a multiplicity of systematically arranged apertures, an active coating on the unapertured surface areas of said lamina, and a second light transmissive lamina having an active coating accessible to electrons transmitted through the apertures in said first lamina.

2. An electro-optical component in accordance with claim 1 and wherein the active coatings on said laminae exhibit different color-response characteristics.

3. An electro-optical component in accordance with claim 1 and wherein said laminae are mounted in contact with each other.

4. An electro-optical component in accordance with claim 1 and wherein said active coatings are electrically conductive and said laminae are disposed in spaced-apart relationship to permit the separate energization of said electrically conductive active coatings.

5. An electro-optical component for a television transducer comprising a first light-transmissive lamina containing a multiplicity of systematically arranged apertures, an active coating on the unapertured surface areas of said lamina, a second light transmissive lamina containing apertures disposed in register with said coated areas of said first lamina and having an active coating accessible to electrons transmitted through the apertures in said first lamina.

6. An electro-optical component for a television transducer comprising a first light transmissive lamina containing at least two closely spaced groups of systematically arranged apertures, an active coating having a certain color response-characteristic on the unapertured surface areas of said lamina, a second light transmissive lamina having an active coating of another color response-characteristic accessible to electrons transmitted through one aperture-group of said first lamina and containing a group of apertures disposed in register with the apertures of another of the aperture groups in said first lamina, and a third light transmissive lamina having an active coating of a third color response-characteristic accessible to electrons transmitted through the registered ones of the apertures in said first and second laminae.

7. An electro-optical component in accordance with claim 6 and wherein said second and said third laminae are provided respectively with a group of apertures in register with the coated areas on said first lamina to provide an unobstructed passage for light-rays of said first mentioned color response-characteristic.

8. An electro-optical component in accordance with claim 7 and wherein said third lamina is provided with a second group of apertures in register with the coated areas on said second lamina to provide an unobstructed passage for light-rays of said second mentioned color response-characteristic.

References Cited in the file of this patent

UNITED STATES PATENTS

| | | |
|---|---|---|
| 2,442,961 | Ramberg | June 8, 1948 |
| 2,446,248 | Schrader | Aug. 3, 1948 |
| 2,455,710 | Szegho | Dec. 7, 1948 |
| 2,461,515 | Bronwell | Feb. 15, 1949 |
| 2,566,713 | Zworykin | Sept. 4, 1951 |
| 2,580,073 | Burton | Dec. 25, 1951 |
| 2,590,018 | Koller et al. | Mar. 18, 1952 |
| 2,590,764 | Forgue | Mar. 25, 1952 |
| 2,615,087 | Rines | Oct. 21, 1952 |
| 2,630,542 | Goldsmith | Mar. 3, 1953 |